(12) United States Patent
Zhou et al.

(10) Patent No.: US 11,726,836 B2
(45) Date of Patent: Aug. 15, 2023

(54) PREDICTING EXPANSION FAILURES AND DEFRAGMENTING CLUSTER RESOURCES

(71) Applicant: Microsoft Technology Licensing, LLC, Redmond, WA (US)

(72) Inventors: Shandan Zhou, Kenmore, WA (US); Saurabh Agarwal, Redmond, WA (US); Karthikeyan Subramanian, Redmond, WA (US); Thomas Moscibroda, Bellevue, WA (US); Paul Naveen Selvaraj, Bothell, WA (US); Sandeep Ramji, Sammamish, WA (US); Sorin Iftimie, Sammamish, WA (US); Nisarg Sheth, Bothell, WA (US); Wanghai Gu, Woodinville, WA (US); Ajay Mani, Redmond, WA (US); Si Qin, Beijing (CN); Yong Xu, Beijing (CN); Qingwei Lin, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 552 days.

(21) Appl. No.: 16/900,730

(22) Filed: Jun. 12, 2020

(65) Prior Publication Data
US 2021/0389894 A1 Dec. 16, 2021

(51) Int. Cl.
*G06F 9/50* (2006.01)
*G06F 9/455* (2018.01)
(Continued)

(52) U.S. Cl.
CPC ........ *G06F 9/5083* (2013.01); *G06F 9/45558* (2013.01); *G06F 9/505* (2013.01);
(Continued)

(58) Field of Classification Search
None
See application file for complete search history.

(56) References Cited

U.S. PATENT DOCUMENTS

| 8,874,749 B1 * | 10/2014 | Vittal | G06F 9/5077 |
| | | | 709/226 |
| 2012/0331147 A1 * | 12/2012 | Dutta | G06F 9/5088 |
| | | | 709/226 |
| 2020/0027014 A1 * | 1/2020 | Wen | G06N 5/02 |

OTHER PUBLICATIONS

Mishra et al., "De-Fragmenting the Cloud", 2016, IEEE Computer Society, 16th IEEE/ACM International Symposium on Cluster, Cloud and Grid Computing, pp. 511-520. (Year: 2016).*

* cited by examiner

*Primary Examiner* — Qing Yuan Wu
(74) *Attorney, Agent, or Firm* — Ray Quinney & Nebeker P.C; James Bullough

(57) ABSTRACT

The present disclosure relates to systems, methods, and computer readable media for predicting expansion failures and implementing defragmentation instructions based on the predicted expansion failures and other signals. For example, systems disclosed herein may apply a failure prediction model to determine an expansion failure prediction associated with an estimated likelihood that deployment failures will occur on a node cluster. The systems disclosed herein may further generate defragmentation instructions indicating a severity level that a defragmentation engine may execute on a cluster level to prevent expansion failures while minimizing negative customer impacts. By uniquely generating defragmentation instructions for each node cluster, a cloud computing system can minimize expansion failures, increase resource capacity, reduce costs, and provide access to reliable services to customers.

20 Claims, 7 Drawing Sheets

(51) Int. Cl.
*G06F 11/07* (2006.01)
*G06F 11/30* (2006.01)
*G06F 11/34* (2006.01)

(52) U.S. Cl.
CPC ........ *G06F 11/076* (2013.01); *G06F 11/0709* (2013.01); *G06F 11/301* (2013.01); *G06F 11/3006* (2013.01); *G06F 11/3433* (2013.01); *G06F 2009/4557* (2013.01)

PREDICTING EXPANSION FAILURES AND DEFRAGMENTING CLUSTER RESOURCES

BACKGROUND

A cloud computing system refers to a collection of computing devices capable of providing remote services and resources. For example, modern cloud computing infrastructures often include a collection of physical server devices organized in a hierarchical structure including computing zones, virtual local area networks (VLANs), racks, fault domains, etc. For instance, many cloud computing services are partitioned into clusters of nodes (e.g., node clusters). Cloud computing systems often make use of different types of virtual services (e.g., computing containers, virtual machines) that provide remote storage and computing functionality to various clients or customers. These virtual services can be hosted by server nodes on a cloud computing system.

As cloud computing continues to grow in popularity, managing different types of services and providing adequate cloud-based resources to customers has become increasingly difficult. For example, demand for cloud-based resources often grows over time for certain customers for a variety of reasons. As a result, customers are often requesting allocation of additional resources. With increased demand, however, conventional systems for allocating cloud-based resources often experience failures or expend considerable costs scaling resources to accommodate deployment expansions and other increases in cloud utilization.

In addition to deployment growth, many customer deployments may expire or decrease over time for a variety of reasons. For example, the lifetime of certain deployment may expire resulting in retirement of various services. Other customers may simply downgrade based on a specific customer or application experiencing a decrease in demand for computing resources. As a result, resource capacity often becomes fragmented across server nodes and clusters of the cloud computing system. This fragmented capacity may result in variety of problems including, for example, expansion failures for existing customers as well as allocation failures for new deployments. Moreover, addressing fragmented capacity by simply adding new server nodes to accommodate expansions and deployment requests may result in inefficient utilization of cloud computing resources as well as high computing costs for both cloud service providers and customers.

DETAILED DESCRIPTION

Figure 1:
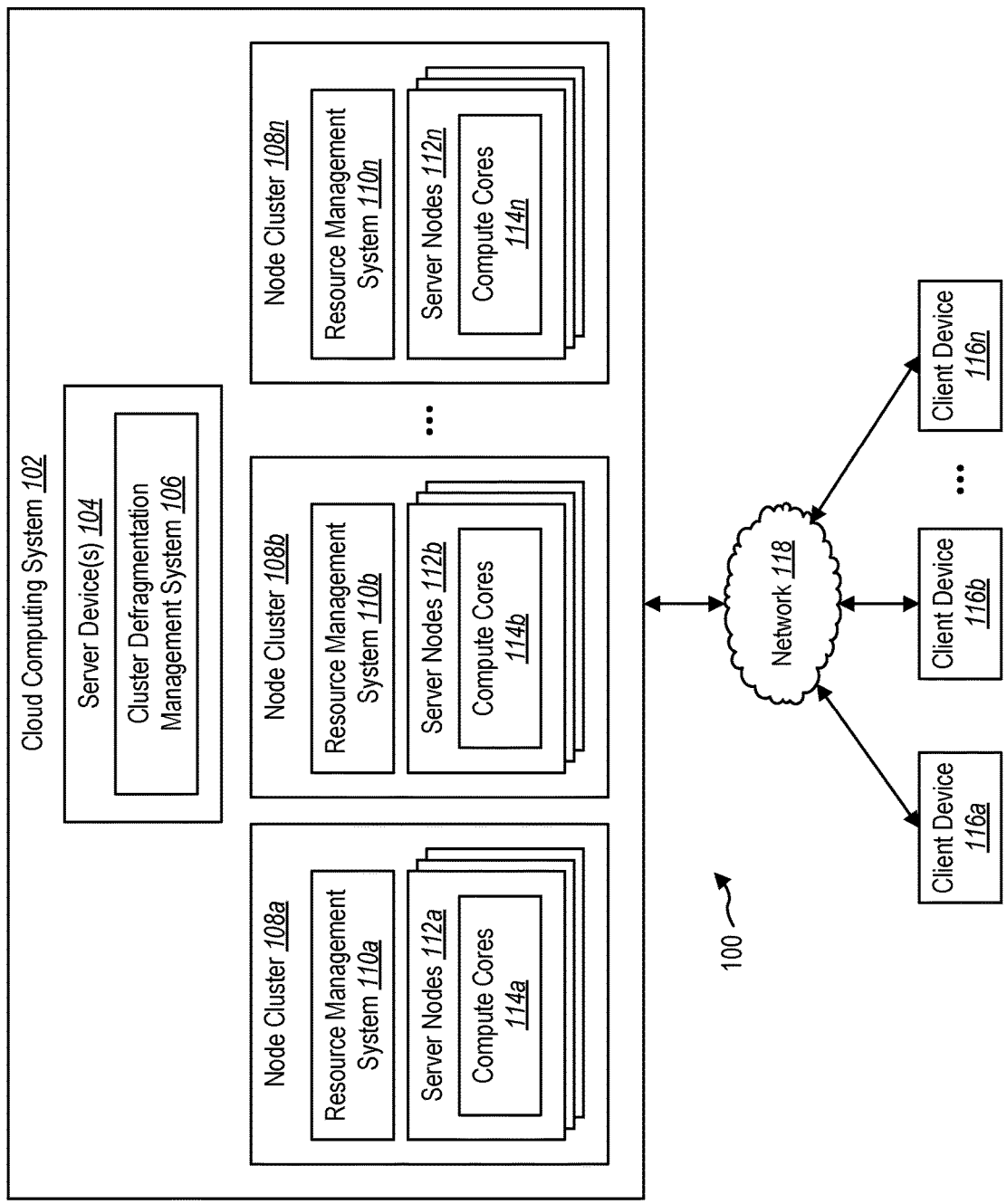
FIG. 1 illustrates an example environment of a cloud computing system including cluster defragmentation management system in accordance with one or more embodiments.

The present disclosure is generally related to predicting expansion failures for deployments on node clusters of a cloud computing system. The present disclosure further relates to proactively preventing future expansion failures by defragmenting a capacity of server nodes on the cluster(s) of the cloud computing system. For example, the present disclosure describes a cluster defragmentation management system that proactively determines whether a current set of allocations on a node cluster is at risk of experiencing expansion failures based on observed utilization data for the node cluster and other features of deployments implemented thereon. The cluster defragmentation management system can additionally generate and implement defragmentation instructions at an appropriate severity level in accordance with the determined prediction of expansion failures on the node cluster. One or more embodiments described herein reduce instances of expansion failures while also decreasing costs associated with increased hardware overhead.

By way of example, and as will be discussed in further detail below, the cluster defragmentation management system can identify cluster features for a node cluster based on utilization data for the node cluster. The cluster defragmentation management system can additionally determine one or more expansion failure metrics for the node cluster based on the identified cluster features. For example, the cluster defragmentation management system can predict expansion failures for a set of deployments on the node cluster based on the cluster features. In one or more embodiments, the cluster defragmentation management system may generate defragmentation instructions applicable to the node cluster, which may include an identified severity of defragmentation that should take place on the node cluster to avoid upcoming expansion failures. The node cluster may execute or otherwise implement defragmentation on server nodes of the node cluster in accordance with one or more embodiments described herein.

The present disclosure includes a number of practical applications that provide benefits and/or solve problems associated with preventing expansion and other allocation failures on node clusters of a cloud computing system. Examples of these applications and benefits are discussed in further detail below.

For example, conventional systems typically react to expansion and other allocation failures using a reactive approach to observed failures that have recently occurred for a set of deployments. Nevertheless, rather than waiting until allocation failures have already happened and responding after the fact, one or more embodiments described herein involve a proactive approach to preventing expansion failures. In particular, by determining expansion failure metrics that include an expansion failure prediction for a set of deployments on a node cluster, the cluster defragmentation management system can determine whether expansion failures are expected to happen even where no expansion failures (or a very limited number of expansion failures) have recently taken place on the node cluster.

In addition, where conventional systems often implement inflexible and inefficient approaches to preventing various allocation failures, the cluster defragmentation management implements a defragmentation routine based on specific features of the corresponding cluster to increase effective capacity across a variety of node clusters hosting virtual machines having different workload characteristics. For example, where many conventional computing systems attempt to avoid failures by implementing uniform policies that underutilize available resources in order to ensure that adequate resources exist for future deployments and/or deployment expansions, the cluster defragmentation management system evaluates utilization data on a cluster-by-cluster basis and determines a cluster-unique approach to defragmenting computing capacity on the cloud computing system. In this way, the cluster defragmentation management system can increase effective capacity across node clusters having different characteristics.

In addition, where conventional cloud computing systems often simply add additional cores and/or servers to a network infrastructure to ensure adequate computing resources, the cluster defragmentation management system increases effective hardware capacity by implementing defragmentation instructions at an appropriate severity level for the respective cluster(s). For example, rather than simply adding additional hardware to a network infrastructure to accommodate growing resource demand or to ensure an adequate number of available empty server nodes, the cluster defragmentation management system can reduce significant costs associated with installing and maintaining hardware by implementing defragmentation policies that accommodate additional deployments while decreasing a number of expansion failures on the cloud computing system.

As illustrated in the foregoing discussion, the present disclosure utilizes a variety of terms to describe features and advantages of the systems described herein. Additional detail is now provided regarding the meaning of some example terms.

For example, as used herein, a "cloud computing system" refers to a network of connected computing devices that provide various services to customer devices (e.g., client devices, network devices). For instance, as mentioned above, a distributed computing system can include a collection of physical server devices (e.g., server nodes) organized in a hierarchical structure including clusters, computing zones, virtual local area networks (VLANs), racks, fault domains, etc. In addition, it will be understood that while one or more specific examples and implementations described herein relate specifically to "clusters" or "node clusters" of server nodes, features and functionality described in connection with one or more node clusters can similarly relate to racks, regions of nodes, datacenters, or other hierarchical structures in which network devices are grouped together. The cloud computing system may refer to a private or public cloud computing system.

As used herein, "utilization data" may refer to any information associated with allocation, deployment, or utilization of resources on a cloud computing system. For example, utilization data may refer to states of utilization on a node cluster captured at different points in time (e.g., a snapshot of resource utilization). Examples of utilization data may include a number of nodes and/or node cores on a node cluster having virtual machines or other services thereon, a metric of fragmentation or shape of resource utilization such as a number of empty nodes and/or percentage of node cores in use by virtual machines, and observed trends of utilization over time (e.g., cross-day utilization, intra-day utilization). Utilization data may further include data associated with properties or characteristics of hardware and/or services (e.g., virtual machines) on a node cluster. Utilization data may refer to raw data and/or refined or extrapolated data that provides a description of resource utilization on a node cluster for a set of customer deployments.

As will be discussed in further detail below, a cluster defragmentation management system may generate or identify cluster features (or feature signals) from the utilization data. The cluster features may refer to any signal or identifiable characteristic of customer deployments or of a node cluster (e.g., hardware and/or software components of the node cluster) that may be provided as an input to a model (e.g., a machine learning model) for determining failure metrics for the node cluster(s).

Cluster features or feature signals may refer to different types of characteristics or categories of features such as snapshot log data or a utilization log including signals associated with utilization on the node cluster. By way of example, and as will be discussed in further detail below, these signals may refer to a current or recent availability of empty server nodes on the node cluster, a difference between a current core utilization and a total capacity of compute cores on the node cluster, or a fragmentation metric based on a ratio of available compute cores in a set of server nodes (e.g., occupied or partially occupied nodes) and a total number of compute cores in the set of server nodes. As a further example, cluster features may refer to property log signals (e.g., characteristics associated with hardware types and/or virtual machine types) and/or event log signals (e.g., update request information).

As used herein, a "deployment," "customer deployment," or "tenant deployment" may refer interchangeably to one or more associated services and allocations provided by a cloud computing system via a node cluster. For example, a deployment may refer to one or multiple services and/or applications provided to or otherwise accessible to a customer (or multiple associated customers) using computing resources of a node cluster. A deployment may refer to one or multiple services provided based on an initial deployment request. In one or more embodiments described herein, a deployment refers exclusively to related services and allocations within a single node cluster.

As used herein, a "current deployment" or "existing deployment" refers to a deployment that has been previously permitted and is currently located or otherwise running within a node cluster. Thus, a "set of existing deployments" or a "set of current deployments" may refer to a set of one or multiple deployments that have been previously permitted and are currently located within and which may be eligible for upgrade or expansion, such as scaling in or scaling out resources within a node cluster.

As used herein, a "core," "compute core," or "node core" may refer interchangeably to a computing resource or unit of computing resources provided via a computing node (e.g., a server node) of a cloud computing system. A compute core may refer to a virtual core that makes use of the same processor without interfering with other virtual cores operating in conjunction with the processor. Alternatively, a compute core may refer to a physical core having a physical separation from other compute cores. Compute cores implemented on one or across multiple server nodes may refer to a variety of different cores having different sizes and capabilities. A server node may include one or multiple compute cores implemented thereon. Furthermore, a set of multiple cores may be allocated for hosting one or multiple virtual machines or other cloud-based services.

As used herein, an "expansion" or "deployment expansion" may refer generally to an increase, decrease, or other change in utilization or allocation of resources on a cloud computing system for an existing deployment. In one or more embodiments, an expansion may refer to an allocation of additional computing resources (e.g., server nodes, node cores) for an existing deployment. In addition, or as an alternative, an expansion may refer to any modification of resources allocated for a customer, including a decrease in allocated resources and/or a change in a number of cores allocated for one or more virtual machines. Indeed, a deployment expansion may refer to any change in an existing deployment resulting in an increase, decrease, or fragmented shape of resource utilization on a node cluster for the associated deployment. In one or more embodiments, an expansion may be a result of a request to modify a subscription for a customer corresponding to a current deployment on the node cluster.

Additional detail will now be provided regarding a cluster defragmentation management system and one or more resource management systems in relation to illustrative figures portraying example implementations. For example, FIG. 1 illustrates an example environment 100 including a cloud computing system 102. The cloud computing system 102 may include any number of devices. For example, as shown in FIG. 1, the cloud computing system includes one or more server device(s) 104 having a cluster defragmentation management system 106 implemented thereon. In addition to the server device(s) 104, the cloud computing system may include any number of node clusters 108a-n. One or more of the node clusters 108a-n may be grouped by geographic location (e.g., a region of node clusters). In one or more embodiments, the node clusters 108a-n are implemented across multiple geographic locations (e.g., at different datacenters or on different racks including one or multiple node clusters).

Each of the node clusters 108a-n may include a variety of server nodes having a number and variety of compute cores. In addition, one or more virtual machines or other cloud computing resources and services may be implemented on the compute cores of the server nodes. For example, as shown in FIG. 1, a first node cluster 108a may include a resource management system 110a tasked with managing resources of the first node cluster 108a. As will be discussed in further detail below, the resource management system 110a may include a defragmentation engine for executing or otherwise carrying out defragmentation instructions in accordance with an identified severity level to defragment a computing capacity on the node cluster 108a.

As further shown in FIG. 1, the first node cluster 108a may include a first set of server nodes 112a. Each node from the first set of server nodes 112a may include one or more compute core(s) 114a. One or more of the compute cores 114a may include virtual machines and/or other cloud computing services implemented thereon. In one or more embodiments, the first node cluster 108a may include allocated resources and services for a set of customer deployments currently deployed on the node cluster 108a. The server node(s) 112a may include any number and variety of compute cores 114a. Moreover, the server node(s) 112a may host a number and a variety of virtual machines and other services. As shown in FIG. 1, the cloud computing system 102 may include multiple node clusters 108a-n. Each of the node clusters 108a-n may include a resource management system 110a-n, server nodes 112a-n, and compute cores 114a-n.

As shown in FIG. 1, the environment 100 may include a plurality of client devices 116a-n in communication with the cloud computing system 102 (e.g., in communication with different server nodes 112a-n via a network 118). The client devices 116a-n may refer to various types of computing devices including, by way of example, mobile devices, desktop computers, server devices, or other types of computing devices. The network 118 may include one or multiple networks that use one or more communication platforms or technologies for transmitting data. For example, the network 118 may include the Internet or other data link that enables transport of electronic data between respective client devices 116a-n and devices of the cloud computing system 102.

As mentioned above, one or more resources (e.g., virtual machines) of a first node cluster 108a (or other node cluster from the plurality of node clusters 108a-n) may include resources including one or multiple compute cores occupied or otherwise in use by a customer. For example, a first deployment may refer to one or multiple virtual machines on the same server node or across multiple server nodes that provides access to a large-scale computation application to a user of the first client device 116a (or multiple client devices). As another example, a second deployment may refer to one or more virtual machines on the same server node or across multiple server nodes that provides access to a gaming application to a second client device 116b (or multiple client devices).

As will be discussed in further detail below, the cluster defragmentation management system 106 may collect utilization data for the node clusters 108a-n including features and characteristics of computing resources (e.g., nodes and compute cores) that are allocated, occupied, or otherwise in use with respect to a set of existing deployments. As will be discussed in further detail below, the cluster defragmentation management system 106 can analyze the utilization data to generate cluster features and determine expansion failure metrics associated with observed and/or predicted failure of deployment expansions on the node clusters 108a-n. For example, the cluster defragmentation management system 106 can collect utilization data and analyze the utilization data to determine one or more failure metrics associated with predicted and/or observed expansion failures on the node clusters 108a-n.

As used herein, a failure metric may refer to a variety of indicators associated with failure of one or more deployments on a node cluster. For example, a failure metric may refer to a prediction that a node cluster will experience one or more expansion failures within an upcoming period of time. As another example, a failure metric may refer to one or more observed failures that have occurred within a recent period of time. In one or more implementations, a failure metric may refer to an availability (e.g., a current availability) of empty server nodes (e.g., healthy empty nodes) on the node cluster. Additional examples of failure metrics will be discussed below in connection with illustrative examples.

In one or more embodiments, the cluster defragmentation management system 106 utilizes failure metrics to generate defragmentation instructions for a given node cluster. For example, where the cluster defragmentation management system 106 determines that a first node cluster 108a is associated with failure metrics that indicate a high probability of expansion failure during an upcoming period of time, the cluster defragmentation management system 106 can generate defragmentation instructions indicating that the resource management system 110a on the first node cluster 108a should implement defragmentation at a high level of severity. Alternatively, where the cluster defragmentation management system 106 determines that a second node cluster 108b includes failure metrics that indicate a low probability of expansion failure during an upcoming period of time, the cluster defragmentation management system 106 may generate defragmentation instructions indicating that the resource management system 110b on the second node cluster 108b should implement defragmentation at a low or minimum level of severity.

In addition, and as will be discussed in further detail below, the cluster defragmentation management system 106 can receive one or more additional parameters or inputs for use in determining specific instructions for defragmenting a capacity on a given node cluster. For example, the cluster defragmentation management system 106 may receive one or more user inputs (e.g., from an administrator or domain level expert for one or more clusters of the cloud computing system 102) indicating one or more thresholds and/or cluster-specific fragmentation parameters. In determining specific defragmentation instructions, the cluster defragmentation management system 106 may consider a combination of failure metrics and additional inputs (e.g., manual inputs) in determining an appropriate severity level for defragmenting a computing capacity on the node cluster(s).

As mentioned above, the cluster defragmentation management system 106 can determine and generate defragmentation instructions that are unique to any number of node clusters 108a-n. For example, the cluster defragmentation management system 106 can collect utilization data from each of the node clusters 108a-n and determine failure metrics for each of the node clusters 108a-n. In addition, the cluster defragmentation management system 106 can receive additional instructions to modify or supplement defragmentation instructions for any of the node clusters 108a-n to further refine a severity with which the resource management systems 110a-n can carry out defragmentation on the respective node clusters 108a-n.

In one or more embodiments, the cluster defragmentation management system 106 is implemented as part of a more comprehensive central resource system. For example, the cluster defragmentation management system 106 may refer to a subsystem of a central resource system that generates and provides other information such as policies regarding new allocations, predictions of various allocation failures, general capacity and utilization predictions, virtual migration impact metrics, or any other information related to the management of resources on the cloud computing system 102. Accordingly, while one or more embodiments described herein relate specifically to a cluster defragmentation management system 106 that generates and implements defragmentation instructions for the node clusters 108a-n, it will be appreciated that one or more additional systems and engines may similarly communicate information to the resource management systems 110a-n for use in managing the resources and other aspects on the respective node clusters 108a-n.

Figure 2:
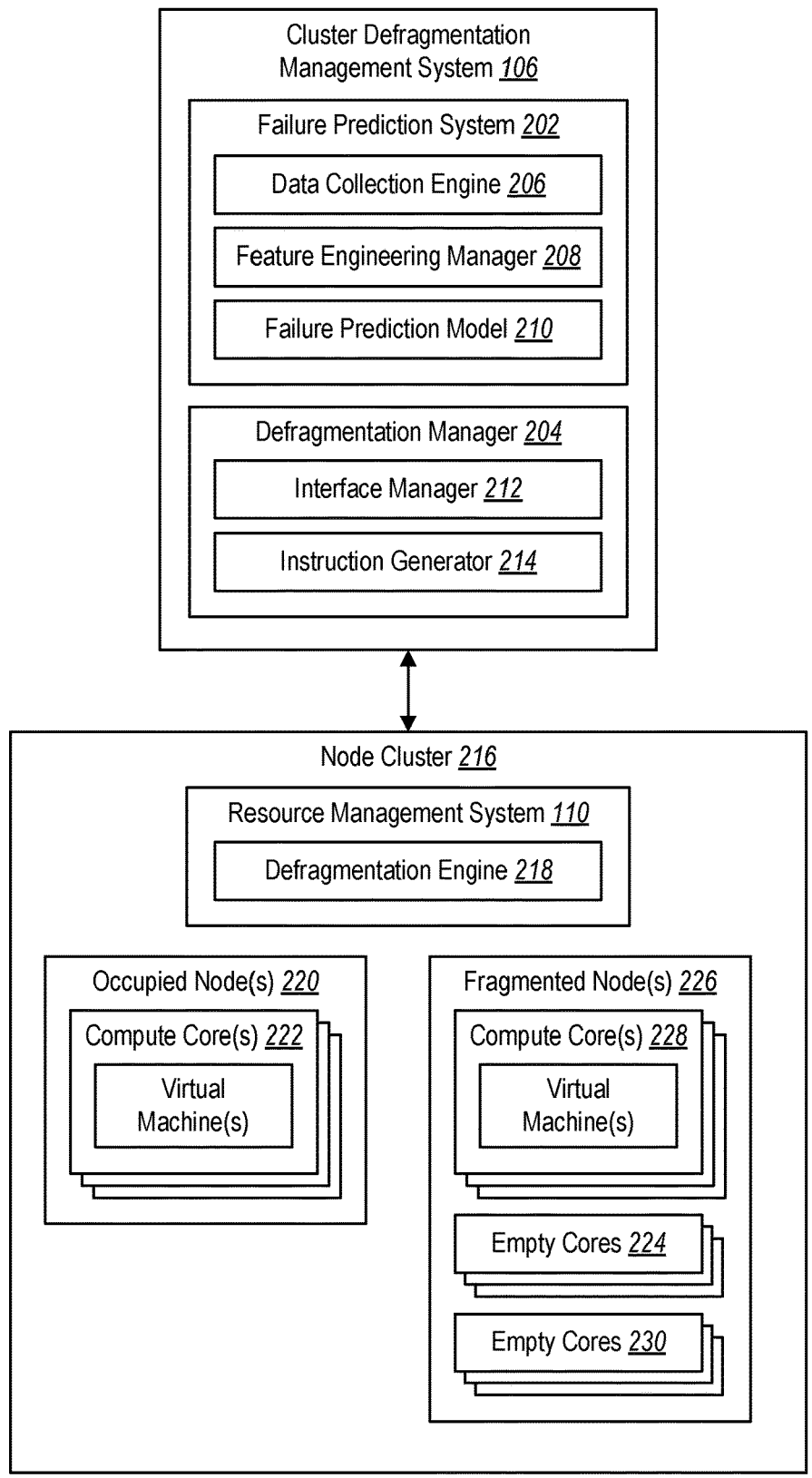
FIG. 2 illustrates an example implementation in which the cluster defragmentation management system predicts expansion failures and implements defragmentation instructions in accordance with one or more implementations.

FIG. 2 illustrates an example implementation in which the cluster defragmentation management system 106 determines failure metrics for an example node cluster and generates defragmentation instructions for the node cluster based on the determined failure metrics. For example, FIG. 2 illustrates an example implementation in which the cluster defragmentation management system 106 evaluates utilization data for a single node cluster 216 and determines an appropriate level of severity that a defragmentation engine 218 on the node cluster 216 should use in defragmenting a capacity of server nodes on the node cluster 216. Features and characteristics discussed in connection with the illustrated example of FIG. 2 can similarly apply to any of the multiple node clusters 108a-n on the cloud computing system 102 discussed above in connection with FIG. 1.

It will be noted that while FIGS. 1-2 illustrate features and functionality for preventing expansion failures on server nodes of a node cluster, features and functionality of the cluster defragmentation management system 106 and resource management system 110 may similarly be implemented in connection with a deployment on a different network unit or organization of networked devices. For instance, while one or more embodiments described herein relate to a node cluster, similar features for preventing expansion failures on a node cluster may similarly apply to a specific server rack, a virtual network, an availability zone, or set of computing resources including server nodes and compute cores capable of being used for deployment of virtual machines thereon.

As shown in FIG. 2, the cluster defragmentation management system 106 includes a failure prediction system 202 and a defragmentation manager 204. As further shown, the failure prediction system 202 may include a data collection engine 206, a feature engineering manager 208, and a failure prediction model 210. Each of the components 206-210 of the failure prediction system 202 may cooperatively collect and evaluate utilization data to determine a prediction (e.g., a probability score) associated with whether the node cluster 216 is expected to experience expansion failures over an upcoming period of time. For example, as will be discussed in further detail below in connection with FIGS. 3 and 4A, the failure prediction system 202 can determine an estimated probability that the node cluster 216 will experience one or more expansion failures as a result of growth of one or more current deployments hosted by the node cluster 216.

As further shown, defragmentation manager 204 may include an interface manager 212 and an instruction generator 214. Each of these components 212-214 may cooperatively generate instructions for defragmenting resource capacity on the node cluster 216 based on a variety of signals including one or more expansion failure metrics. For example, as will be discussed in further detail below in connection with FIGS. 3 and 4B, the defragmentation manager 204 can receive expansion failure metrics including a failure prediction, information indicating a current state of fragmentation on the node cluster 216 (e.g., a number of observed expansion failures, a current number of empty server nodes), and additional utilization data to use in determining a severity level to apply by a defragmentation engine 218. Moreover, in one or more embodiments, the defragmentation manager 204 receives one or more user inputs indicating modifications to one or more fragmentation parameters that may be used to modify defragmentation instructions for the node cluster 216.

As discussed above, the node cluster 216 may include a resource management system 110 implemented thereon. As shown in FIG. 2, the resource management system 110 may further include a defragmentation engine 218. As used herein, the defragmentation engine 218 may refer to a processing or orchestrating engine configured to implement instructions to cause one or more modifications to virtual machines and server nodes in a way that modifies distribution of capacity across nodes of the node cluster 216. For example, the defragmentation engine 218 may orchestrate defragmentation in a variety of ways in accordance with an identified severity level. This may include migrating (e.g., live-migrating) virtual machines from one server node to another. This may include decommissioning one or more virtual machines and/or spinning up additional virtual machines elsewhere. Indeed, the defragmentation engine

218 may perform any number of defragmentation actions resulting in distribution of resource utilization across nodes of the node cluster 216.

As mentioned above, the defragmentation engine 218 may orchestrate defragmentation in accordance with a determined severity level. As used herein, a severity level may refer to a measure of aggressiveness of redistributing or consolidating the resource load across nodes of the node cluster 216. As an example, the defragmentation engine 218 may perform defragmentation actions in accordance with a severity level based on an impact of performing the defragmentation actions on a customer. For instance, where a defragmentation engine 218 is performing defragmentation at a low severity level, the defragmentation engine 218 may perform live migration on virtual machines where live migrating the virtual machines would result in minimal impact to a customer (e.g., a customer impact less than a minimum threshold). Alternatively, where the defragmentation engine 218 is performing defragmentation at a high severity level, the defragmentation engine 218 may perform live migration aggressively and quickly with little or no consideration on whether performing live migration will impact a customer. Additional details and examples in connection with performing defragmentation actions in accordance with different severity levels will be discussed below in connection with FIGS. 3-4B.

While one or more embodiments described herein refer specifically to features and functionalities of a cluster defragmentation management system 106 and a resource management system 110, it will be understood that features and functionality described in connection with each of the systems 106, 110 may similarly apply to one another. For instance, one or more components of the cluster defragmentation management system 106 may be implemented at the cluster level (e.g., as a sub-component of the resource management system 110). Conversely, one or more components or features of the resource management system 110 may be implemented on the cluster defragmentation management system 106 or on a central resource system hosted by the server device(s) 104 and which is configured to orchestrate defragmentation on a plurality of node clusters.

As further shown, the node cluster 216 may include any number and variety of server nodes. For example, the node cluster 216 may include occupied nodes 220 in which compute cores 222 have virtual machines or other services implemented thereon. In particular, the occupied nodes 220 may refer to fully occupied nodes in which all cores are occupied by one or more virtual machines hosted on the server nodes. The node cluster 216 may also include empty nodes 224 having no virtual machines deployed thereon. Because the empty nodes 224 have no virtual machines deployed thereon, the empty nodes 224 may be used by the resource management system 110 for a variety of applications. For instance, the empty nodes 224 may be used as a target destination for any virtual machine on the node cluster 216. Moreover, the empty nodes 224 may be used to perform repairs, updates, or any other operation on the node cluster 216 where occupied or fragmented nodes may be incompatible or unavailable. In one or more embodiments, and as will be discussed in further detail below, the resource management system 110 may mandate or have a setting that mandates a minimum number of empty nodes 224 on the node cluster 216 to ensure that the node cluster 216 be capable of supporting expansions as well as dealing with various emergency scenarios such as a server rack going down unexpectedly (e.g., due to a power outage or other service interruption event). The node cluster 216 may similarly have a target number of empty nodes corresponding to a desired number of empty nodes that ensure peak performance of the node cluster 216.

As further shown, the node cluster 216 may include a number of fragmented nodes 226. In particular, as shown in FIG. 2, the fragmented nodes 226 may include occupied compute cores 228 having virtual machines deployed thereon. In one or more embodiments, a virtual machine may be deployed on multiple compute cores. The fragmented nodes 226 may additionally include empty cores 230 having no virtual machines deployed thereon. Where a fragmented node includes a number of empty cores capable of hosting a virtual machine, the virtual machine may be deployed to the empty cores. However, where a fragmented node includes fewer empty cores than is needed to host a virtual machine, the virtual machine would need to be deployed to a different node, such as an empty node or another fragmented node having enough empty cores. As will be discussed in further detail herein, the cluster defragmentation management system 106 may determine a likelihood of expansion failures based on a number or percentage of compute cores occupied by virtual machines as well as fragmentation characteristics of nodes on the node cluster 216.

Each of the components of the cluster defragmentation management system 106 and resource management system 110 may be in communication with each other using any suitable communication technologies. In addition, while components of the systems 106, 110 are shown to be separate in FIG. 2, any of the components or subcomponents may be combined into fewer components, such as into a single component, or divided into more components as may serve a particular implementation. As an illustrative example, the data collection engine 206 and/or feature engineering manager 208 may be implemented on different server devices of a cloud computing system as the failure prediction model 210.

In addition, the components of the systems 106, 110 may include hardware, software, or both. For example, the components of the systems 106, 110 may include one or more instructions stored on a computer-readable storage medium and executable by processors of one or more computing devices. When executed by the one or more processors, the computer-executable instructions of one or more computing devices (e.g., server device(s) 104, server nodes) can perform one or more methods described herein. Alternatively, the components of the systems 106, 110 may include hardware, such as a special purpose processing device to perform a certain function or group of functions. Additionally, or alternatively, the components of the systems 106, 110 may include a combination of computer-executable instructions and hardware.

An example implementation of the cluster defragmentation management system 106 and resource management system 110 will now be discussed in connection with an example framework illustrated in FIG. 3. As mentioned above, and as shown in FIG. 3, the cluster defragmentation management system 106 may include a failure prediction system 202 and a defragmentation manager 204. In addition, the resource management system 110 may include a defragmentation engine 218.

Figure 3:
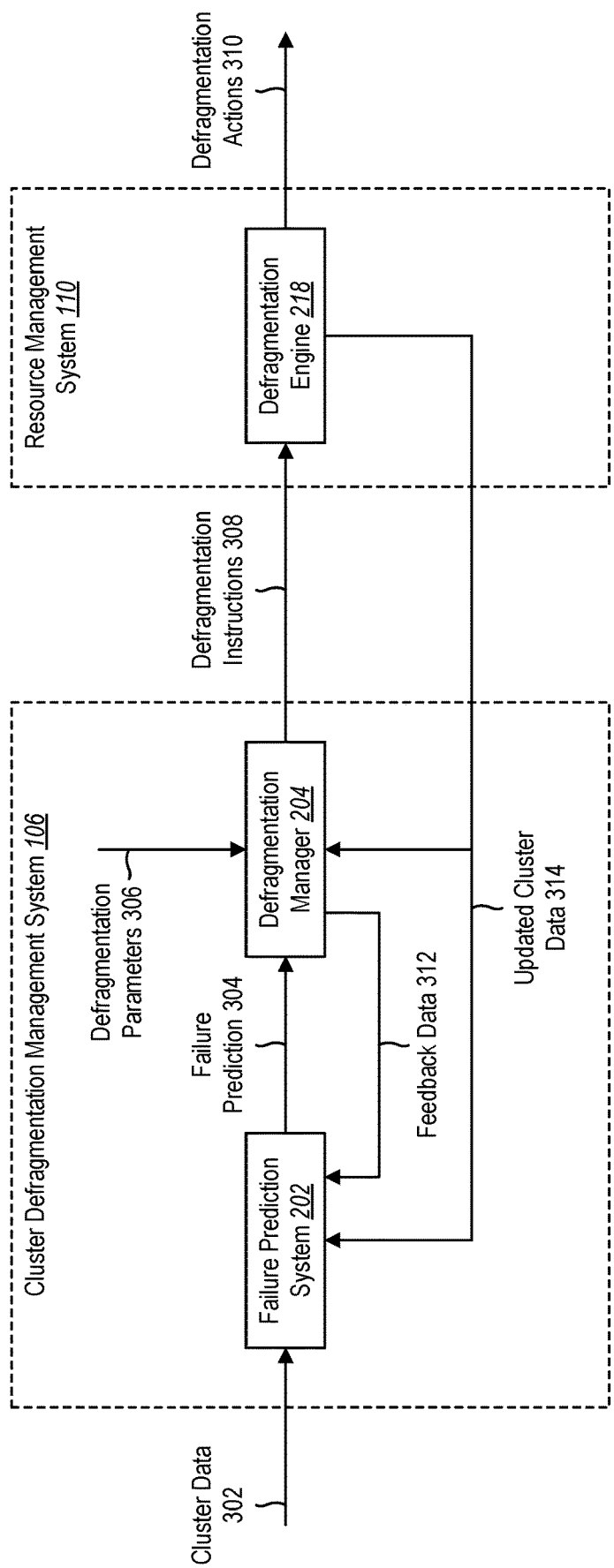
FIG. 3 illustrates an example framework for implementing the cluster defragmentation management system in accordance with one or more embodiments.

As shown in FIG. 3, the failure prediction system 202 can receive cluster data 302. The cluster data 302 may include observed data about a node cluster including one or more types of utilization data. By way of example and not limitation, the failure prediction system 202 can receive cluster data including cluster property information, workload information, a status of empty nodes (e.g., a number of healthy empty nodes), virtual machine lifetime information, policy limits applicable to the node cluster, and a fragmentation index or other metric(s) of fragmentation across nodes of the node cluster. In one or more embodiments, the cluster data 302 is received or otherwise accessed from a data store maintained by a central resource system configured to collect utilization data and other data about a plurality of node clusters on the cloud computing system.

Based on the cluster data 302, the failure prediction system 202 can generate a failure prediction 304 indicating a level of risk or other classification for the node cluster. For example, the failure prediction system 202 may determine a risk of expansion failure based on the utilization data indicating a likelihood that a node cluster associated with the utilization data will experience an expansion failure in an upcoming period of time. In one or more embodiments, the failure prediction system 202 applies a failure prediction model (e.g., a machine learning model) to the utilization data to determine the failure prediction 304. Additional detail in connection with analyzing the utilization data and applying a failure prediction model to determine a failure prediction 304 is discussed below in connection with FIG. 4A.

As shown in FIG. 3, the failure prediction system 202 may provide the failure prediction 304 to the defragmentation manager 204. Based on the failure prediction 304, the defragmentation manager 204 can determine an appropriate level of severity that a defragmentation engine 218 should use in implementing a defragmentation routine on a given node cluster. As shown in FIG. 3, in addition to the failure prediction 304, the defragmentation manager 204 can receive one or more defragmentation parameters 306 to additionally consider in determining a level of severity and/or generating instructions for defragmenting a resource capacity of the node cluster. As mentioned above, and as will be discussed in further detail below, the defragmentation parameters 306 may refer to one or more received user inputs indicating one or more metrics such as a target number of empty nodes or a modification to a determined level of severity that the defragmentation manager 204 may consider in generating defragmentation instructions 308. Additional information in connection with generating defragmentation instructions 308 in view of a number of failure metrics and/or user inputs will be discussed below in connection with FIG. 4B.

As shown in FIG. 3, the defragmentation manager 204 can generate defragmentation instructions 308 based on one or more failure metrics including, by way of example, the failure prediction 304 and the defragmentation parameters 306. As further shown, the defragmentation manager 204 can provide the defragmentation instructions 308 to the defragmentation engine 218 for further processing. As discussed above and as shown in FIG. 3, the defragmentation engine 218 may be implemented at a cluster level while the failure prediction system 202 and defragmentation manager 204 are implemented on a server device in communication with multiple defragmentation engines on different node clusters of a cloud computing system 102.

As shown in FIG. 3, the defragmentation engine 218 can execute or otherwise implement the defragmentation instructions 308 to perform a variety of defragmentation actions 310 on a node cluster. In particular, the defragmentation engine 218 can perform a variety of actions on virtual machines hosted by the node cluster such as live-migrating virtual machines between server nodes to defragment the current computing capacity on the node cluster. For example, the defragmentation engine 218 can live-migrate virtual machines to consolidate workloads on fragmented nodes to increase a number of empty nodes on the node cluster. In one or more embodiments, the defragmentation engine 218 continues performing defragmentation actions 310 until a target number of healthy nodes are available on the node cluster.

As mentioned above, the defragmentation engine 218 can implement the defragmentation actions 310 based on a severity level indicated by the defragmentation instructions 308. As an example, where the defragmentation instructions 308 indicate a low severity level (e.g., based on a failure prediction 304 indicating a low probability of expansion failure), the defragmentation engine 218 may initiate live-migration with a high or heavily weighted consideration to whether live-migrating a given virtual machine will have a negative customer impact. This may involve selectively migrating virtual machines of particular types that may be live-migrated with little or negative impact on customer. For example, the defragmentation engine 218 may limit performance of live-migration based on a low impact threshold such that the defragmentation engine 218 selectively live-migrates virtual machines only where live-migrating the virtual machines is expected to have a low or minimal impact to a customer. As a further example, this may involve selectively migrating virtual machines for lower priority customers while allowing virtual machines for higher priority customers to continue running on otherwise fragmented server nodes.

As another example, where the defragmentation instructions 308 indicate a high severity level (e.g., based on a failure prediction 304 indicating a high probability of expansion failure), the defragmentation engine 218 may initiate live-migration with little consideration to whether live-migrating virtual machines will have a negative customer impact. This may involve raising an impact threshold in determining whether to live-migrate a virtual machine. In one or more implementations, this may involve live-migrating virtual machines between server nodes without any consideration to customer impact or without distinguishing between customers associated with high or low priority accounts.

In one or more embodiments, the defragmentation engine 218 modifies an existing defragmentation routine based on defragmentation instructions 308 received from the defragmentation manager 204. For example, in one or more embodiments, the defragmentation engine 218 may continually run a low severity level routine that involves live-migrating virtual machines while avoiding or otherwise limiting negative customer impact. The defragmentation engine 218 may change that routine to a higher severity level, however, based on a failure prediction 304 and/or defragmentation parameters 306 indicating that a higher level of severity in defragmenting a capacity of the node cluster should be applied. Accordingly, in response to updated defragmentation instructions 308, the defragmentation engine 218 may implement a defragmentation routine at a higher severity level based on updated defragmentation instructions 308, which may be based on real-time (or near real-time) observations of utilization activity on the node cluster.

As shown in FIG. 3, one or more components of the cluster defragmentation management system 106 may be self-evaluating. As an example, in one or more embodiments, the defragmentation manager 204 may provide feedback data 312 to the failure prediction system 202 for use in determining future failure predictions. For instance, where one or more defragmentation parameters 306 indicate a modification to a target number of empty nodes or a modification to an indicated level of severity corresponding to a failure prediction 304, the feedback data 312 may be used by the failure prediction system 202 to modify a failure prediction model in an effort to determine future instances of failure predictions that align with the defragmentation parameters 306.

As another example, the failure prediction system 202 and/or defragmentation manager 204 may receive updated cluster data 314 including additional utilization information observed on the node cluster. This updated cluster data 314 may refer to modifications to the capacity of the node cluster as a result of the defragmentation actions 310. In addition, the updated cluster data 314 may include observed expansion failures and/or changed utilization patterns over time. In one or more embodiments, the failure prediction system 202 and/or defragmentation manager 204 may modify models (e.g., the failure prediction model) or algorithms implemented thereon to fine-tune future instances of the failure prediction 304 and/or defragmentation instructions 308. In this manner, one or more components of the cluster defragmentation management system 106 may improve over time in implementing a defragmentation routine at an appropriate severity level that prevents expansion failures while minimizing a negative customer impact caused by live-migrating virtual machines on the resource management system 110.

Figure 4A:
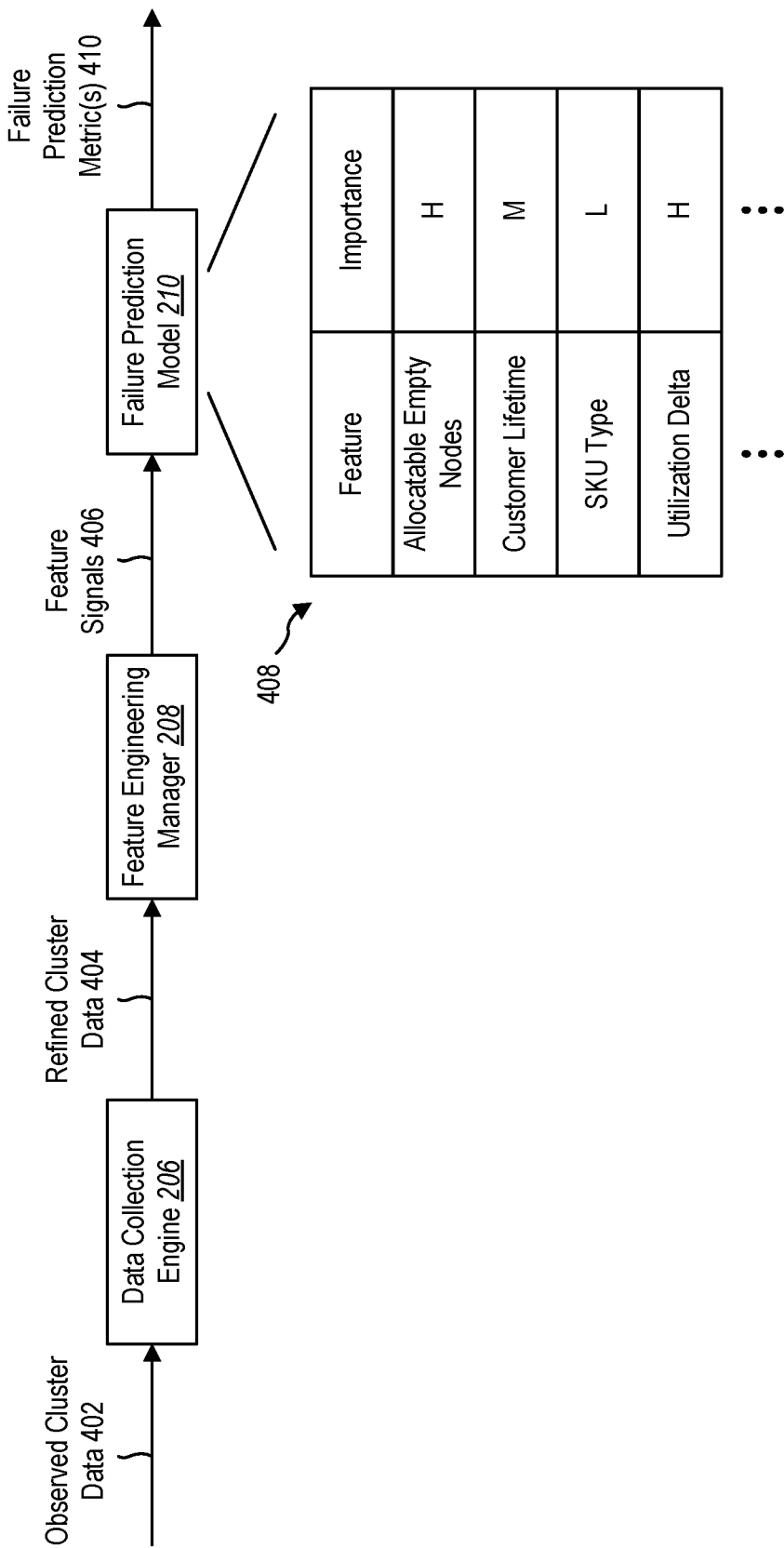
FIG. 4A illustrates an example framework for predicting expansion failures in accordance with one or more embodiments.
Figure 4B:
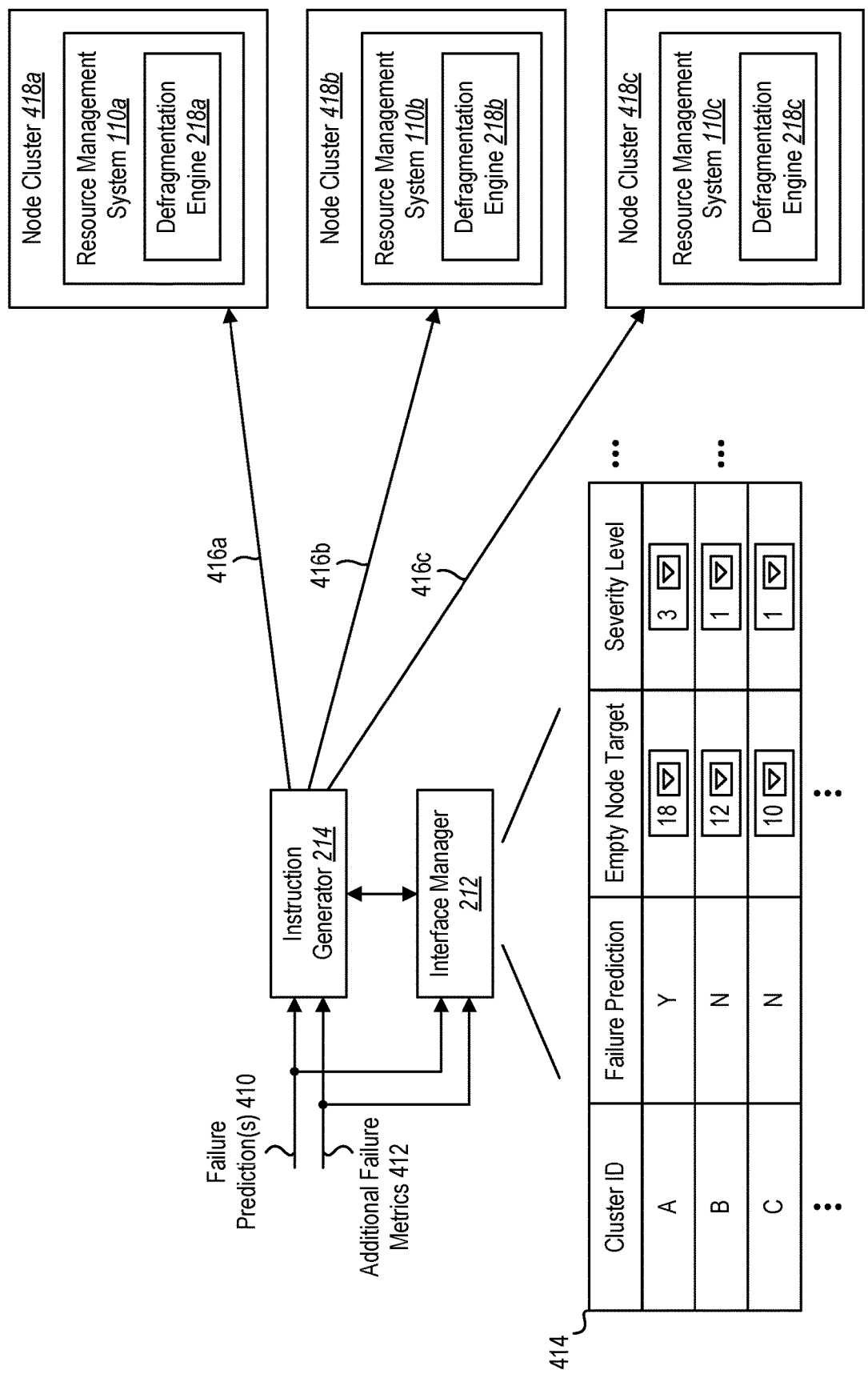
FIG. 4B illustrates an example framework for generating and implementing defragmentation instructions in accordance with one or more embodiments.

Additional detail in connection with one or more embodiments will now be discussed in conjunction with FIGS. 4A-4B. In particular, FIG. 4A illustrates an example workflow implemented by a failure prediction system 202 in accordance with one or more embodiments and which may include similar features and functionality as the failure prediction system 202 discussed in FIG. 3. Further, FIG. 4B illustrates an example workflow implemented by a defragmentation manager 204 and defragmentation engine 218 in accordance with one or more embodiments and which may include similar features and functionality as the corresponding components discussed in FIG. 3.

As shown in FIG. 4A, a failure prediction system 202 may implement a workflow that involves receiving and evaluating utilization data and generating a failure prediction metric in accordance with one or more embodiments described herein. In particular, as shown in FIG. 4A, a data collection engine 206 may receive observed cluster data 402 including any information associated with utilization of resources as well as properties and characteristics of devices and services of a node cluster. While the data collection engine 206 may receive observed cluster data 402 from any number of node clusters, for ease in explanation, the example in FIG. 4A will be discussed in connection with receiving observed cluster data 402 for a single node cluster.

The data collection engine 206 can collect a variety of types of utilization data. For example, the data collection engine 206 may receive a series of snapshot logs indicating states of resource utilization on the node cluster over time. For example, the data collection engine 206 may receive a snapshot log of data including various types of information such as an availability of server nodes at a corresponding point in time, a difference between a current core utilization on the node cluster and a total capacity of compute cores on the node cluster, or a ratio of available compute cores in a set of server nodes and a total number of compute cores on the set of server nodes.

In addition to snapshot log data indicating states of resource utilization over time, the data collection engine 206 can collect property log data including characteristics of hardware (e.g., hardware types) on the node cluster as well as virtual machine types deployed on the node cluster. The data collection engine 206 may further collect event log data including update request information or other customer behavior data associated with a set of deployments on the node cluster. In each of the above example, the data collection engine 206 may collect raw utilization data at points in time (e.g., at corresponding timestamps) associated with utilization of resources and/or properties of devices and services on the node cluster. For example, the data collection engine 206 may capture or otherwise obtain periodic snapshots of utilization data for the node cluster at different points in time.

In one or more embodiments, the data collection engine 206 may sample information at regular or irregular intervals. In one or more implementations, the data collection engine 206 collects utilization information about a subset of nodes and/or cores rather than collecting comprehensive information about each and every core or server node of the node cluster. Thus, in one or more embodiments, the data collection engine 206 generates refined cluster data 404 that includes a more comprehensive set of information (e.g. utilization data) for the node cluster over a previous duration of time. The data collection engine 206 may generate the refined cluster data 404 in a variety of ways.

For example, in one or more embodiments, the data collection engine 206 performs a statistical analysis and quantity measurement of the raw cluster data to identify errors and implications of the data. In one or more embodiments, the data collection engine 206 applies an adaptive interpolation approach to fill in missing or incomplete data associated with the utilization and/or characteristics of nodes and/or virtual machines of the node cluster. This may include observing trends of a number of compute cores occupied by virtual machines and other information indicating trends of compute capacity and fragmentation characteristics of the node cluster. Indeed, the data collection engine 206 may employ a number of interpolation approaches to generate the refined cluster data 404.

As an illustrative example, where one or more occupied nodes and fragmented nodes have historically been occupied by the same number of virtual machines for a stable period of time and where a number of empty nodes remains relatively unchanged over time, the data collection engine 206 may extrapolate utilization data and other information based on a mean, median, or mode value of core capacity and utilization for the node of the node cluster. As another example, where historical data associated with utilization of cluster resources fluctuates in a predictable or periodic way, the data collection engine 206 can apply a one or more regression models to predict fluctuating utilization information over time. For example, where utilization statistics increase or otherwise fluctuate on weekends as a result of higher utilization by customers for certain types of virtual machines, the data collection engine 206 can apply a regression model to the historical data to extrapolate similar fluctuations on weekends or other days of the week. The data collection engine 206 may similarly apply a regression or other model over longer periods of time to identify long-term trends, such as increased utilization due to deployment expansions and/or a change in fragmentation characteristics over time.

As a further example, the data collection engine 206 can employ a more complex model to predict non-obvious utilization trends than mean, median, mode, or simple regression models. For example, the data collection engine 206 can employ a machine learning model, algorithm, or other deep learning model(s) trained to extrapolate utilization data and other information where no obvious pattern exists in the utilization of cluster resources over time. In one or more embodiments, the data collection engine 206 employs a processing model trained to extrapolate the refined cluster data by applying each of the processing models (e.g., mean, mode, mean regression, complex model) depending on the trends of portions of the raw data collected by the data collection engine 206.

In addition to identifying trends of deployment growth and expansions corresponding to periodic increases over short period of time (e.g., hourly, daily), the data collection engine 206 can extrapolate or identify growth trends over longer periods of time (e.g., one or more weeks or months). For example, in addition to identifying periodic trends including expansion and contraction of deployments from day to day, the data collection engine 206 may identify gradual growth over time as expansions occur and deployments gradually grow closer to full capacity of the node cluster. In addition, the data collection engine 206 can observe or identify a gradual change in fragmentation of the capacity based on lifetimes of virtual machines expiring and/or customers unsubscribing and/or downgrading deployments over time.

As shown in FIG. 4A, the data collection engine 206 can provide the refined cluster data 404 to a feature engineering manager 208 for further processing. In particular, the feature engineering manager 208 can receive the refined cluster data 404 and generate cluster features (e.g., feature signals) to provide as input to a failure prediction model 210. For example, the feature engineering manager 208 can evaluate the refined cluster data and determine any number of feature signals that the failure prediction model 210 is trained to receive or otherwise recognizes as valid input to use in generating a failure prediction for the node cluster. These feature signals may relate to one or more types of the utilization data as well as characteristics of hardware and/or services on the node cluster.

For example, the feature engineering manager 208 can generate any number of cluster features (e.g., feature signals) from the refined cluster data that correspond or correlate to a target metric. In particular, the feature engineering manager 208 can process the received cluster data and generate feature signals that correspond to whether one or more expansions for a set of deployments on a node cluster will fail. In one or more embodiments, the feature engineering manager 208 generates the feature signals based exclusively on the received refined cluster data 404. Alternatively, in one or more embodiments, the feature engineering manager 208 further refines the cluster data (e.g., combines data from snapshots of the utilization data over time) to generate any number of feature signals to provide as input to the failure prediction model 210.

As shown in FIG. 4A, the feature engineering manager 208 can generate a variety of feature signals associated with utilization of resources on the node cluster. The feature engineering manager 208 may employ a variety of feature engineering approaches, including both data-driven and context-driven approaches. For example, the feature engineering manager 208 can generate signals associated with utilization (e.g., a data driven approach) and/or signals associated with cluster properties of the node cluster that utilize domain knowledge of the node cluster, existing deployments, and/or the cloud computing platform.

Indeed, the feature engineering manager 208 can generate any number and a wide variety of feature signals for use in determining a probability that a set of deployments on the node cluster will experience one or more (or a predetermined threshold of) expansion failures over a period of time (e.g., an upcoming threshold period of time). In addition, the feature signals may include a wide variety of signals associated with different trends or data points. In one or more embodiments, the feature engineering manager 208 may generate thousands of different feature signals having variable levels of correlation to whether a set of deployments will experience an expansion failure within a threshold period of time.

By way of example and not limitation, the feature signals may include signals associated with time based log data (e.g., a snapshot log). Examples of these types of signals may include an identified state or trend of allocable healthy empty nodes (e.g., a count or trend of healthy empty nodes within a node cluster), a utilization delta value (e.g., difference between current utilization and a maximum utilization that a node cluster can reach), a fragmentation index value (e.g., a measure of fragmentation within a node cluster, such as the sum of available cores in each used node divided by a total number of cores from these used or partially used nodes), or a tenant hourly expansion value (e.g., an hourly scale up of physical cores for a deployment over a predetermined period, such as an hour).

As another example, the feature signals may include signals associated with property log data. Examples of these types of signals may include stock keeping unit (SKU) type (e.g., an identification of a hardware generation of nodes and/or cores), a cluster type (e.g., a type of virtual machine family that can be supported by nodes on the node cluster, such as a graphic processing unit or various types of compute services), an account type (e.g., internal or external customer), or an offer type (e.g., a free trial, a premium subscriber). Another example property log data signal may include an identified region or size of the cluster (e.g., U.S. East, Europe West).

As a further example, the feature signals may include signals associated with event log data including information associated with expansions and/or expansion requests for deployments on a node cluster. Examples of event log data signals may include instances of expansion core requests (e.g., a number of physical cores requested by one or more observed expansion operations) and/or instances of requests that were not fulfilled (e.g., expansions or number of cores that the node cluster failed to fulfill).

The above instances of feature signals are provided by way of example and not limitation. It will be appreciated that the feature engineering manager 208 may generate any number of features that the failure prediction model 210 is trained to receive as input. In one or more embodiments, the feature engineering manager 208 may be configured to generate new types of feature signals over time as expansion failures are observed and further correlations are determined between different combinations of utilization data and expansion failures. In one or more embodiments, the feature engineering manager 208 may identify combinations of multiple feature signals having a high correlation to expansion failures and further generate additional feature signals based on combinations of the utilization data and/or discrete feature signals.

In one or more embodiments, the feature engineering manager 208 generates a set of distinct features associated with a particular node cluster (e.g., for each node cluster from a plurality of node clusters on the cloud computing system). Nevertheless, in one or more embodiments, the feature engineering manager 208 selectively identifies a subset of the feature signals to provide as input to the failure prediction model 210. For example, the feature engineering manager 208 may employ a two-step feature selection approach for selecting signals to provide as inputs. As a first step, the feature engineering manager 208 can leverage classic feature selection to select candidate features, such as feature importance ranking, feature filtering via stepwise regression, or feature penalization through regularization. The feature engineering manager 208 can selectively evaluate top feature signals or more important feature signals (e.g., feature signals having a high degree of correlation with expansion failures) while discarding or otherwise minimizing the impact of less important feature signals.

As shown in FIG. 3, the feature engineering manager 208 can provide a set of feature signals 406 to the failure prediction model 210. Upon receiving the feature signals, the failure prediction model 210 can generate an output including a failure prediction. The failure prediction may include an indication (e.g., a value or category) associated with an estimated likelihood that the node cluster will have one or more expansion failures for an existing set of deployments over a predetermined period of time (e.g., within 1-2 days, within a week).

In one or more embodiments, the failure prediction model 210 outputs a failure prediction metric including a category that characterizes a likelihood of expansion failures. For instance, the failure prediction model 210 can generate a classification of low, medium, or high corresponding to low, medium, and high risks of expansion failure. Alternatively, in one or more embodiments, the failure prediction model 210 simply generates a numerical value associated with a probability or estimated likelihood that the node cluster will experience expansion failure(s) within a predetermined period of time.

In one or more embodiments, the failure prediction model 210 calculates a probability score based on a combination of feature signals. The failure prediction model 210 may further determine a category corresponding to a risk of expansion failure based on the probability score. Alternatively, the failure prediction model 210 can provide a failure probability score to the defragmentation manager 204 to determine a corresponding risk or risk category. In either case, the failure prediction model 210 may determine the risk category based on a comparison of the probability score to one or more risk thresholds. As an example, in one or more embodiments, the failure prediction model 210 determines the failure probability metric including a risk metric in accordance with the following equation:

$$\text{Risk of Upgrade } Failure_\tau = \begin{cases} \text{low,} & p_i < \alpha \\ \text{medium,} & \text{Otherwise} \\ \text{high,} & p_i > \beta \end{cases}$$

where $p_i$ represents the predicted confidence of a single label classification (e.g., failure v. non-failure) and where $\alpha$ and $\beta$ refer to tuned thresholds based on a target fragmentation or goal associated with defragmenting a capacity on the node cluster. For example, node clusters with high risk of expansion failures may be optimized for extremely high ground truth failures within the corresponding risk category (e.g., bucket) while node clusters with low risk of expansion failures may be optimized for significantly low ground truth failures.

As shown in FIG. 4A, the failure prediction model 210 may consider a feature list 408 including features associated with variable levels of importance. To illustrate, the failure prediction model 210 may consider a feature list 408 including each of any number of feature signals that the failure prediction model 210 is trained to receive as input and process in accordance with training of the failure prediction model 210. In the example of FIG. 4A, the feature list 408 includes feature signals and associated categories of importance that correspond to a measure of importance of the respective feature. For ease in explanation, each of the feature signals shown have a high, medium, or low level of importance corresponding to a degree of correlation between the feature signals and whether an expansion probability is predicted to occur on the node cluster. In one or more embodiments, the failure prediction model 210 generates the feature list 408 based on training data used to train the failure prediction model 210.

In one or more embodiments, the failure prediction model 210 may receive additional parameters and/or training data for use in determining the failure prediction metric 410. For example, as discussed in above in connection with FIG. 3, the failure prediction model 210 can receive feedback data and/or updated cluster data that may be used to fine-tune or refine the failure prediction model 210 to more accurately determine the failure prediction model for future states of the node cluster. In one or more embodiments, the failure prediction model 210 may receive model parameters such as a user input or other value indicating a modified foal of the node cluster, such as a modification to a target number of empty nodes that may influence a determination of a risk category for the node cluster.

In one or more embodiments, the failure prediction model 210 refers to a machine learning model, deep learning model, or other type of model for determining the failure prediction metric 410 for the node cluster. In one or more embodiments, the failure prediction model 210 includes or utilizes or utilizes a decision tree model. As shown in FIG. 4A, the failure prediction model 210 can provide the failure prediction metric 410 to the defragmentation manager 204 for further processing.

FIG. 4B shows an example continuation of the workflow discussed in FIG. 4A including an interface manager 212 and an instruction generator 214. As will be discussed in further detail, the interface manager 212 and an instruction generator 214 can receive the failure prediction metric 410 (and additional information) and cooperatively determine a set of instructions for a plurality of node clusters. In particular, while FIG. 4A illustrates an example in which data is collected and analyzed for a single node cluster, the failure prediction system 202 may similarly evaluate cluster data and generate failure prediction metrics for each of a plurality of node clusters.

As shown in FIG. 4B, the instruction generator 214 may receive the failure prediction metric(s) 410 for a plurality of node clusters. In accordance with one or more embodiments discussed above, the failure prediction metric(s) 410 may include an indicated probability or risk category associated with an estimated likelihood that a respective node cluster will experience one or more expansion failures within an upcoming period of time.

In addition to the failure prediction metric(s) 410, the instruction generator 214 may receive additional failure metrics 412 for use in generating defragmentation instructions. For example, instruction generator 214 may receive additional failure metrics 412 including an indication of whether expansion failures are already happening on the node cluster(s). In one or more embodiments, the instruction generator 214 receives an additional failure metric including a current state of empty nodes on the node cluster(s). The additional failure metrics may be provided from the failure prediction system 202 and/or the node cluster itself.

In one or more embodiments, the failure prediction metrics 410 and the additional failure metrics 412 are provided to an interface manager 212 for use in generating a workbench interface 414 including a compilation of relevant data that may be presented to a user. For example, as shown in FIG. 4B, the interface manager 212 may provide the workbench interface 414 via a graphical user interface of a client device (e.g., an administrator device). As shown in FIG. 4B, the workbench interface 414 may include a presentation of any number of failure metrics associated with corresponding node clusters of the cloud computing system.

As shown in FIG. 4B, the workbench interface 414 may include a cluster identifier indicating a name, region, or other identifier of each node cluster from a plurality of node cluster. The workbench interface 414 may further include a listing of failure predictions determined for each of the node clusters. For instance, in the example shown in FIG. 4B, the failure prediction model 210 may have output a high risk category failure prediction for a first cluster node (cluster A) and low risk category failure predictions for a second and third node cluster (clusters B-C). The workbench interface 414 may alternatively include a probability score, risk category, and/or any additional information associated with the failure prediction output by the failure prediction model 210. While FIG. 4B illustrates one example implementation of the workbench interface 414, the workbench interface 414 may include any number of parameters and signals associated with any number of node clusters.

As further shown, the workbench interface 414 may include a listing of empty node targets for each of the node clusters. As shown in FIG. 4B, the target number of empty nodes may differ from cluster to cluster. In the illustrative example shown in FIG. 4B, the first node cluster may have an empty node target of eighteen nodes, the second node cluster may have an empty node target of twelve nodes, and the third node cluster may have an empty node target of ten nodes. These targets may be selected based on characteristics of the corresponding node clusters, such types of virtual machines running thereon and/or a total number of server nodes on the respective node clusters.

As further shown, the workbench interface 414 may include a listing of determined severity levels to apply in generating defragmentation instructions for the respective node clusters. In one or more embodiments, the severity levels are determined based on the corresponding failure predictions. The severity levels may also be determined based on a combination of the failure predictions in combination with additional parameters, such as the additional failure metrics, the empty node target(s) and any additional information that may be provided within the workbench interface 414.

One or more parameters of the workbench interface 414 may be modified based on received user input. For example, as shown in FIG. 4B, the workbench interface 414 includes selectable options for both the empty node target category as well as the severity level that enables an individual (e.g., a customer or domain level expert) to modify one or more of the values within the workbench interface 414. For instance, where an individual is not concerned about customer impact associated with live-migrating virtual machines, the individual may modify one of the lower severity levels to a higher severity level. Alternatively, where a user desires to raise or lower the target number of empty nodes, the user may modify one or more of the empty node target values within the workbench interface 414.

In one or more embodiments, modifying the values of the workbench interface 414 may cause a feedback loop that causes one or more additional values to change. As an example, in response to detecting a change in an empty node target value for the second node cluster, the defragmentation manager 204 may provide an indication of the change to the failure prediction system 202. In response, the failure prediction system 202 may update feature signals and generate an updated failure prediction that classifies the second node cluster as higher risk of expansion failure, which may be associated with a higher severity level. Other examples may involve different combinations of changes within the workbench interface 414.

In one or more embodiments, the workbench interface 414 may indicate a ranking of priority for each of the node clusters identifying an order or priority for generating and/or implementing defragmentation instructions for the set of node clusters. For instance, where a node cluster is hosting virtual machines for high priority customers or where expansion failures would pose a significant threat to important data or services, the interface manager 212 may include an indication of the higher importance or higher ranking for the relevant node cluster(s). In one or more embodiments, a user may manually indicate one or more node clusters that should have a higher priority than others within the listed set of node clusters.

In one or more embodiments, this ranking may be considered in selectively determining a subset of the node clusters that should be defragmented. For example, where the cloud computing system has a processing budget that limits a quantity of nodes or clusters that can be defragmented over a period of time, the ranking may be used to prioritize implementation of defragmentation instructions to ensure that those node clusters having a higher ranking will be defragmented as quickly as possible (within the allocated budget). In one or more embodiments, the node clusters may be defragmented in a specific order based on the priority or ranking indicated within the workbench interface 414.

As shown in FIG. 4B, the instruction generator 214 may receive information from the interface manager 212 (e.g., modifications to one or more parameters) in addition to the failure prediction metric(s) 410 and additional failure metrics 412 and generate defragmentation instructions for each of a plurality of node clusters. In particular, as shown in FIG. 4B, the instruction generator 214 may generate a first set of defragmentation instructions 416a for a first node cluster 418a (cluster A), a second set of defragmentation instructions 416b for a second node cluster 418b (cluster B), and a third set of defragmentation instructions 416c for a third node cluster 418c (cluster C).

In accordance with one or more embodiments described herein, each of the sets of defragmentation instructions 416a-c may include indicated levels of severity for performing defragmentation on the respective node clusters 418a-c. For instance, in the example shown in FIG. 4B, the first set of defragmentation instructions 416a may indicate a "3" severity level indicating to the defragmentation engine 218a to carry out a defragmentation routine at a severity of level of 3 (e.g., a high or medium severity level). The second set of defragmentation instructions 416b may indicate a "1" severity level indicating to a second defragmentation engine 218b to carry out a defragmentation routine at a severity of "1" (e.g., a low or default severity level). Similarly, the third set of defragmentation instructions 416c may indicate a "1" severity level indicating to a third defragmentation engine 218c to carry out a defragmentation routine at a severity level of "1."

Figure 5:
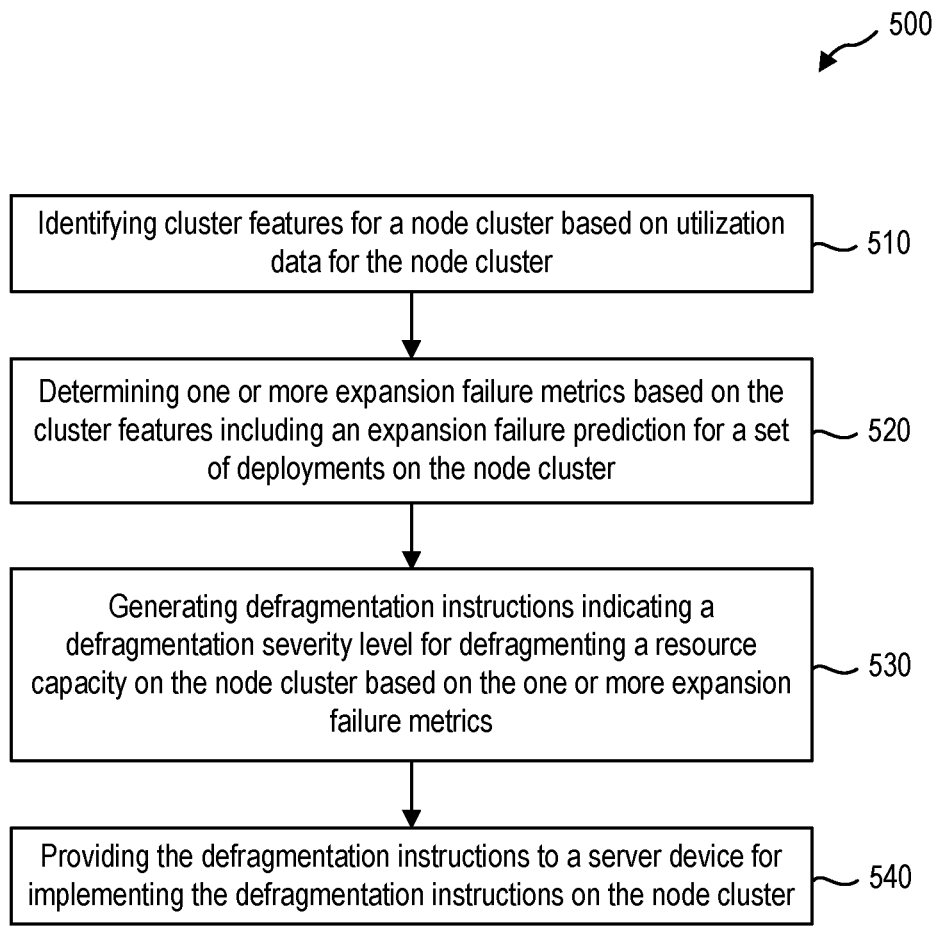
FIG. 5 illustrates an example series of acts for predicting expansion failures and implementing defragmentation instructions in accordance with one or more embodiments.

Turning now to FIG. 5, this figure illustrates an example flowchart including a series of acts for determining a failure prediction and generating defragmentation instructions for a node cluster. While FIG. 5 illustrates acts according to one or more embodiments, alternative embodiments may omit, add to, reorder, and/or modify any of the acts shown in FIG. 5. The acts of FIG. 5 can be performed as part of a method. Alternatively, a non-transitory computer-readable medium can include instructions that, when executed by one or more processors, cause a computing device (e.g., a server device) to perform the acts of FIG. 5. In still further embodiments, a system can perform the acts of FIG. 5.

As shown in FIG. 5, the series of acts 500 may include an act 510 of identifying cluster features for a node cluster based on utilization data for the node cluster. For example, in one or more embodiments, the act 510 involves identifying a plurality of cluster features for a node cluster based on utilization data for the node cluster where the node cluster comprises a grouping of server nodes on a cloud computing system.

In one or more embodiments, the cluster features include one or more of a current availability of empty server nodes on the node cluster, a difference between a current core utilization on the node cluster and a total capacity of compute cores on the node cluster, and/or a fragmentation metric based on a ratio of available compute cores in a set of server nodes and a total number of compute cores on the set of server nodes. The cluster features may further include one or more of property log signals including characteristics associated with hardware types of the node cluster and virtual machine types deployed on the node cluster and/or event log signals including update request information associated with the set of deployments on the node cluster.

As further shown, the series of acts 500 may include an act 520 of determining one or more expansion failure metrics based on the cluster features including an expansion failure prediction for a set of deployments on the node cluster. For example, in one or more embodiments, the act 520 involves determining one or more expansion failure metrics for the node cluster based on the identified plurality of cluster features where at least one of the expansion failure metrics includes an expansion failure prediction for a set of deployments on the node cluster.

In one or more embodiments, the expansion failure prediction includes a risk classification for the node cluster indicating an estimated probability that the set of deployments on the node cluster will experience one or more expansion failures within a threshold period of time. In one or more embodiments, the risk classification includes a risk category from a plurality of possible risk categories where each of the risk categories corresponding to a different defragmentation severity level for performing the one or more defragmentation actions on the node cluster.

In one or more embodiments, the one or more expansion failure metrics includes one or more of an indication of one or more expansion failures that have occurred within a threshold period of time and/or a current availability of empty server nodes on the node cluster. In one or more embodiments, the expansion failure metrics includes one or more cluster-specific fragmentation parameters associated with a threshold performance level for the node cluster. The cluster-specific fragmentation parameters may include one or more of a minimum availability of empty server nodes on the node cluster or a target availability of empty server nodes on the node cluster.

As further shown, the series of acts 500 includes an act 530 of generating defragmentation instructions indicating a defragmentation severity level for defragmenting a resource capacity on the node cluster based on the one or more expansion failure metrics. For example, in one or more embodiments, the act 530 involves generating defragmentation instructions applicable to the node cluster based on the one or more expansion failure metrics where the defragmentation instructions indicate a defragmentation severity level for performing one or more defragmentation actions on the node cluster.

In one or more embodiments, receiving a user input involves identifying one or more cluster-specific fragmentation parameters (as indicated above). Further, in one or more embodiments, generating the defragmentation instructions includes determining the defragmentation severity level based on a combination of the expansion failure prediction and the received user input identifying the one or more cluster-specific fragmentation parameters.

As further shown, the series of acts 500 includes an act 540 of providing defragmentation instructions to a server device for implementing the defragmentation instructions on the node cluster. For example, in one or more embodiments, the act 540 involves providing the defragmentation instructions to a server device associated with the node cluster for implementing the one or more defragmentation actions on server nodes of the node cluster.

In one or more embodiments, the series of acts 500 includes identifying additional cluster features for a second node cluster based on additional utilization data for the second node cluster. The series of acts 500 may also include determining additional expansion failure metrics for the node cluster based on the identified additional cluster features. The series of acts 500 may also include generating additional defragmentation instructions applicable to the additional node cluster based on the additional expansion failure metrics.

In one or more embodiments, the defragmentation instructions and the additional defragmentation instructions each include an indicated level of priority for performing defragmentation on the node cluster and the additional node cluster. Further, in one or more embodiments, the series of acts 500 includes determining an order of implementing defragmentation actions on the node cluster and the additional node cluster based on the indicated level of priority for each of the node cluster and the additional node cluster.

Figure 6:
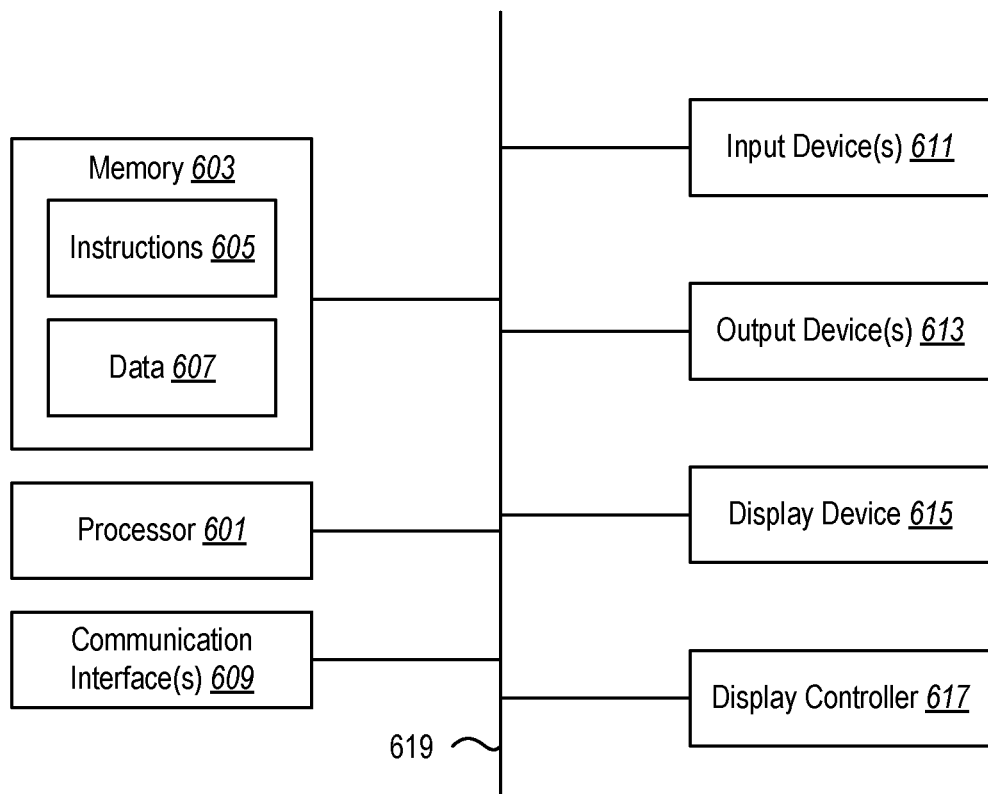
FIG. 6 illustrates certain components that may be included within a computer system.

FIG. 6 illustrates certain components that may be included within a computer system 600. One or more computer systems 600 may be used to implement the various devices, components, and systems described herein.

The computer system 600 includes a processor 601. The processor 601 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   identifying a plurality of cluster features for a node cluster based on utilization data for the node cluster, wherein the node cluster comprises a grouping of server nodes on a cloud computing system;
   determining one or more expansion failure metrics for the node cluster based on the identified plurality of cluster features, at least one of the expansion failure metrics including an expansion failure prediction for a set of deployments on the node cluster;
   generating defragmentation instructions applicable to the node cluster based on the one or more expansion failure metrics, the defragmentation instructions indicating a defragmentation severity level for performing one or more defragmentation actions on the node cluster; and
   providing the defragmentation instructions to a server device associated with the node cluster, wherein providing the defragmentation instructions to the server device causes the server device to perform the one or more defragmentation actions on server nodes of the node cluster.

2. The method of claim 1, wherein the cluster features include one or more of:
   a current availability of empty server nodes on the node cluster;

a difference between a current core utilization on the node cluster and a total capacity of compute cores on the node cluster; or a fragmentation metric based on a ratio of available compute cores in a set of server nodes and a total number of compute cores on the set of server nodes.

3. The method of claim 2, wherein the cluster features include one or more of:

property log signals including characteristics associated with hardware types of the node cluster and virtual machine types deployed on the node cluster; or event log signals including update request information associated with the set of deployments on the node cluster.

4. The method of claim 1, wherein the expansion failure prediction includes a risk classification for the node cluster, the risk classification indicating an estimated probability that the set of deployments on the node cluster will experience one or more expansion failures within a threshold period of time.

5. The method of claim 4, wherein the risk classification includes a risk category from a plurality of possible risk categories, each of the risk categories corresponding to a different defragmentation severity level for performing the one or more defragmentation actions on the node cluster.

6. The method of claim 1, wherein the one or more expansion failure metrics further includes one or more of:

an indication of one or more expansion failures that have occurred within a threshold period of time; or a current availability of empty server nodes on the node cluster.

7. The method of claim 1, wherein the one or more expansion failure metrics includes one or more cluster-specific fragmentation parameters associated with a threshold performance level for the node cluster, the one or more cluster-specific fragmentation parameters including one or more of:

a minimum availability of empty server nodes on the node cluster; or a target availability of empty server nodes on the node cluster.

8. The method of claim 7, further comprising:

receiving a user input identifying the one or more cluster-specific fragmentation parameters, wherein generating the defragmentation instructions comprises determining the defragmentation severity level based on a combination of the expansion failure prediction and the received user input identifying the one or more cluster-specific fragmentation parameters.

9. The method of claim 1, further comprising:

identifying additional cluster features for a second node cluster based on additional utilization data for the second node cluster;

determining additional expansion failure metrics for the second node cluster based on the identified additional cluster features; and generating additional defragmentation instructions applicable to the second node cluster based on the additional expansion failure metrics.

10. The method of claim 9, wherein the defragmentation instructions and the additional defragmentation instructions each include an indicated level of priority for performing defragmentation on the node cluster and the second node cluster, and wherein the method further comprises determining an order of implementing defragmentation actions on the node cluster and the second node cluster based on the indicated level of priority for each of the node cluster and the second node cluster.

11. The method of claim 1, wherein the one or more defragmentation actions includes live migrating one or more virtual machines between server nodes to defragment the current computing capacity on the node cluster.

12. The method of claim 1, wherein the one or more defragmentation actions includes live migrating one or more virtual machines to consolidate workloads on fragmented nodes to increase a number of empty nodes on the node cluster.

13. A system, comprising:

one or more processors;

memory in communication with the one or more processors;

instructions stored in the memory, the instructions being executable by the one or more processors to:

identify a plurality of cluster features for a node cluster based on utilization data for the node cluster, wherein the node cluster comprises a grouping of server nodes on a cloud computing system;

determine one or more expansion failure metrics for the node cluster based on the identified plurality of cluster features, at least one of the expansion failure metrics including an expansion failure prediction for a set of deployments on the node cluster;

generate defragmentation instructions applicable to the node cluster based on the one or more expansion failure metrics, the defragmentation instructions indicating a defragmentation severity level for performing one or more defragmentation actions on the node cluster; and provide the defragmentation instructions to a server device associated with the node cluster, wherein providing the defragmentation instructions to the server device causes the server device to perform the one or more defragmentation actions on server nodes of the node cluster.

14. The system of claim 13, wherein the cluster features include one or more of:

a current availability of empty server nodes on the node cluster;

a difference between a current core utilization on the node cluster and a total capacity of compute cores on the node cluster;

a fragmentation metric based on a ratio of available compute cores in a set of server nodes and a total number of compute cores on the set of server nodes;

property log signals including characteristics associated with hardware types of the node cluster and virtual machine types deployed on the node cluster; or event log signals including update request information associated with the set of deployments on the node cluster.

15. The system of claim 13, wherein the expansion failure prediction includes a risk classification for the node cluster, the risk classification indicating an estimated probability that the set of deployments on the node cluster will experience one or more expansion failures within a threshold period of time, and wherein the risk classification includes a risk category from a plurality of possible risk categories, each of the risk categories corresponding to a different defragmentation severity level for performing the one or more defragmentation actions on the node cluster.

16. The system of claim 13, wherein the one or more expansion failure metrics further includes one or more of:
  an indication of one or more expansion failures that have occurred within a threshold period of time; or
  a current availability of empty server nodes on the node cluster.

17. The system of claim 13, wherein the one or more failure metrics includes one or more cluster-specific fragmentation parameters including one or more of a minimum availability of empty server nodes on the node cluster or a target availability of empty server nodes on the node cluster, and further comprising instructions being executable by the one or more processors to:
  receive a user input identifying the one or more cluster-specific fragmentation parameters, wherein generating the defragmentation instructions comprises determining the defragmentation severity level based on a combination of the expansion failure prediction and the received user input identifying the one or more cluster-specific fragmentation parameters.

18. A non-transitory computer readable medium storing instructions thereon that, when executed by one or more processors, causes a computing device to:
  identify a plurality of cluster features for a node cluster based on utilization data for the node cluster, wherein the node cluster comprises a grouping of server nodes on a cloud computing system;
  determine one or more expansion failure metrics for the node cluster based on the identified plurality of cluster features, at least one of the expansion failure metrics including an expansion failure prediction for a set of deployments on the node cluster;
  generate defragmentation instructions applicable to the node cluster based on the one or more expansion failure metrics, the defragmentation instructions indicating a defragmentation severity level for performing one or more defragmentation actions on the node cluster; and
  provide the defragmentation instructions to a server device associated with the node cluster, wherein providing the defragmentation instructions to the server device causes the server device to perform the one or more defragmentation actions on server nodes of the node cluster.

19. The non-transitory computer readable medium of claim 18, wherein the cluster features include one or more of:
  a current availability of empty server nodes on the node cluster;
  a difference between a current core utilization on the node cluster and a total capacity of compute cores on the node cluster;
  a fragmentation metric based on a ratio of available compute cores in a set of server nodes and a total number of compute cores on the set of server nodes;
  property log signals including characteristics associated with hardware types of the node cluster and virtual machine types deployed on the node cluster; or
  event log signals including update request information associated with the set of deployments on the node cluster.

20. The non-transitory computer readable medium of claim 18, wherein the one or more failure metrics includes one or more cluster-specific fragmentation parameters including one or more of a minimum availability of empty server nodes on the node cluster or a target availability of empty server nodes on the node cluster, wherein the instructions, when executed by the one or more processors, causes the computing device to:
  receive a user input identifying the one or more cluster-specific fragmentation parameters, wherein generating the defragmentation instructions comprises determining the defragmentation severity level based on a combination of the expansion failure prediction and the received user input identifying the one or more cluster-specific fragmentation parameters.

\* \* \* \* \*